(12) United States Patent
Olovsson et al.

(10) Patent No.: US 11,932,780 B2
(45) Date of Patent: Mar. 19, 2024

(54) WINTER CAMOUFLAGE COMPRISING HEXAGONAL BORON NITRIDE

(71) Applicant: SAAB AB, Linköping (SE)

(72) Inventors: Ann-Sofie Olovsson, Gamleby (SE); Björn Boström, Angered (SE)

(73) Assignee: SAAB AB, Linköping (SE)

( * ) Notice: Subject to any disclaimer, the term of this patent is extended or adjusted under 35 U.S.C. 154(b) by 18 days.

(21) Appl. No.: 17/426,174

(22) PCT Filed: Jan. 31, 2019

(86) PCT No.: PCT/SE2019/050082
§ 371 (c)(1),
(2) Date: Jul. 28, 2021

(87) PCT Pub. No.: WO2020/159410
PCT Pub. Date: Aug. 6, 2020

(65) Prior Publication Data
US 2022/0112382 A1    Apr. 14, 2022

(51) Int. Cl.
| | |
|---|---|
| *C08K 3/38* | (2006.01) |
| *C09D 5/30* | (2006.01) |
| *C09D 5/33* | (2006.01) |
| *C09D 7/40* | (2018.01) |
| *C09D 7/61* | (2018.01) |
| *C09D 175/04* | (2006.01) |
| *F41H 3/00* | (2006.01) |

(52) U.S. Cl.
CPC ............ *C09D 5/30* (2013.01); *C08K 3/38* (2013.01); *C09D 5/004* (2013.01); *C09D 7/61* (2018.01); *C09D 7/68* (2018.01); *C09D 175/04* (2013.01); *F41H 3/00* (2013.01); *C08K 2003/385* (2013.01); *C08K 2201/005* (2013.01)

(58) Field of Classification Search
None
See application file for complete search history.

(56) References Cited

U.S. PATENT DOCUMENTS

| | | |
|---|---|---|
| 3,300,325 A | 1/1967 | Lindquist |
| 4,347,284 A | 8/1982 | Tsutomu et al. |
| 4,469,745 A | 9/1984 | Robicci |
| (Continued) | | |

FOREIGN PATENT DOCUMENTS

| | | |
|---|---|---|
| BE | 886071 A | 3/1981 |
| GB | 1054178 A | 1/1967 |
| (Continued) | | |

OTHER PUBLICATIONS

International Search Report and Written Opinion dated Oct. 28, 2019 for International Application No. PCT/SE2019/050082, 13 pages.
(Continued)

*Primary Examiner* — Laura C Powers
(74) *Attorney, Agent, or Firm* — Sage Patent Group

(57) ABSTRACT

The present disclosure relates to a camouflage material for use in a snowy environment. The camouflage material includes hexagonal boron nitride (h-BN). The disclosure further relates to the use of hexagonal boron nitride for UV signature management in a camouflage material, as well as a camouflage product including such a camouflage material.

14 Claims, 2 Drawing Sheets

(56) References Cited

U.S. PATENT DOCUMENTS

| | | | |
|---|---|---|---|
| 5,079,048 A | 1/1992 | Anitole | |
| 2012/0211156 A1* | 8/2012 | Harvey | A41D 31/04 |
| | | | 156/277 |
| 2014/0242355 A1* | 8/2014 | Castille | B32B 27/40 |
| | | | 359/359 |
| 2017/0299341 A1* | 10/2017 | Lenz | F41H 3/00 |
| 2019/0063877 A1* | 2/2019 | Annas | F41H 3/02 |
| 2020/0232156 A1* | 7/2020 | Zhang | D06M 23/10 |

FOREIGN PATENT DOCUMENTS

| | | | | |
|---|---|---|---|---|
| JP | 2007284596 A | 11/2007 | | |
| JP | 2010248484 A | 11/2010 | | |
| WO | WO-0013965 A2 * | 3/2000 | | B32B 27/12 |
| WO | 2014195148 A1 | 12/2014 | | |
| WO | 2015065297 A1 | 5/2015 | | |
| WO | 2019015365 A1 | 1/2019 | | |

OTHER PUBLICATIONS

Extended European Search Report dated Jul. 22, 2022 for European Patent Application No. 19913604.5, 6 pages.

* cited by examiner

WINTER CAMOUFLAGE COMPRISING HEXAGONAL BORON NITRIDE

CROSS-REFERENCE TO RELATED APPLICATIONS

This application is a 35 U.S.C § 371 national stage application for International Application No. PCT/SE2019/050082, entitled "WINTER CAMOUFLAGE COMPRISING HEXAGONAL BORON NITRIDE", filed on Jan. 31, 2019, the disclosures and contents of which are hereby incorporated by reference in their entireties.

TECHNICAL FIELD

The present invention relates to a camouflage material for use in a snowy environment, as well as camouflage products comprising such a material.

BACKGROUND ART

The use of multi-spectral imaging systems in military reconnaissance has increased significantly in recent years. Therefore, in order to avoid detection there is a correspondingly increased requirement for effective camouflage (signature management) against such systems.

Winter climates place great demands on signature management equipment. Many parts of the world are covered with snow for at least part of the year. Visually, snowy environments differ greatly from non-snow-covered environments, and camouflage patterns providing visual crypsis (concealment by blending into the surrounding environment) have been developed. However, snow is highly reflective of incident UV light ($\lambda$=250-400 nm, wherein $\lambda$ is the wavelength) and appears bright in UV imaging, whereas most common pigments absorb UV and therefore appear dark. Imaging systems using simple UV filters may therefore be able to identify military targets that lack UV-signature management as dark areas against white, snow-covered backgrounds, even if these targets are not readily visually identifiable. Therefore, in order to avoid detection when operating in snowy environments, specially designed camouflage is required that provides a high UV reflectance.

In order to provide adequate signature management when operating in snowy environments, a number of white pigments have been developed for use in winter camouflage. These white pigments typically provide improved UV-reflectance as compared to traditional white pigments such as titanium dioxide. However, there remains a need for improved means of providing effective camouflage in snowy, wintery environments.

SUMMARY OF THE INVENTION

The inventors of the present invention have identified a number of shortcomings with prior art means of providing winter camouflage. Many prior art pigments for use in winter camouflage, although appearing white in the visible spectral area, have insufficient UV-reflectivity and may appear dark when imaged using a UV filter. This is especially the case upon imaging using shorter wavelength irradiation such as at wavelengths less than 350 nm. Moreover, in order for a substance to appear white when incorporated into a suitable binder, there must be a sufficient difference between the refractive index of the substance and the binder. Many known pigments and fillers appear white when in powder form, but are visually transparent when incorporated into a binder. Many of the best pigments known for winter camouflage purposes are considered to be hazardous under relevant chemical labelling standards such as GHS (Globally Harmonized System of Classification and Labelling), CLP (EU Classification, Labelling and Packaging regulation) and OSHA (Occupational Safety and Health Administration). Finally, many of the best pigments known for winter camouflage have a high density and therefore the resulting camouflage materials are heavy and cumbersome.

It would be advantageous to achieve a camouflage overcoming, or at least alleviating, at least some of the above mentioned shortcomings. In particular, it would be desirable to enable a lighter camouflage having excellent UV-reflectivity and utilizing relatively non-hazardous substances. To better address one or more of these concerns, a camouflage material having the features defined in the independent claims is provided.

The camouflage material is for use in a snowy environment. It is characterised at least in that it comprises hexagonal boron nitride.

Hexagonal boron nitride has been found to be a pigment exceptionally well suited to use in winter camouflage. It has superior UV-reflectivity at the appropriate wavelengths, even when incorporated in a binder or matrix. It is non-hazardous and is not subject to labelling under the relevant standards such as GHS, CLP and OSHA. Moreover, it has a much lower density than most common UV-reflective pigments, and therefore camouflage produced using hexagonal boron nitride may be significantly lighter, thus abetting transport and deployment.

The camouflage material may comprise hexagonal boron nitride having a particle size of from about 0.1 µm to about less than 1 µm, preferably from about 0.4 µm to about 0.6 µm. Such a particle size provides the h-BN pigment with excellent coverage in the visible range.

The camouflage material may comprise hexagonal boron nitride dispersed in a polymer matrix. Thus, camouflage comprising h-BN may be manufactured using polymer materials commonly utilized in the art, either by dispersing directly in the polymer matrix during manufacture, or by coating with a composition comprising h-BN dispersed in a polymer binder.

The camouflage material may comprise from about 1 wt % to about 50 wt % of the hexagonal boron nitride, defined as dry weight relative to the total dry weight of the camouflage material. Such quantities are sufficient to provide a camouflage having desired properties including UV-reflectivity, depending on how the camouflage is arranged.

A surface of the camouflage material may comprise a visual snow camouflage pattern designed to provide visual crypsis in a snowy environment. This provides the camouflage with measures that assist in avoiding visual detection.

The camouflage material may comprise a coated polymer substrate, the coated polymer substrate comprising a coating layer and a polymer substrate, wherein the coating layer comprises hexagonal boron nitride. This means that known polymer substrates and manufacturing methods may be utilized in manufacturing the camouflage material, since coated camouflage materials are widely used in the art. Thus, the cost and disruption of introducing camouflage comprising h-BN pigment is reduced.

The coating layer may have a thickness of from about 10 µm to about 100 µm, preferably from about 15 µm to about less than 30 µm. This provides a thin, light and flexible camouflage material whilst maintaining adequate signal management properties.

The coating layer may comprises from about 20 wt % to about 50 wt % of the hexagonal boron nitride, preferably from about 30 wt % to about 40 wt %, defined as dry weight relative to the total dry weight of the coating layer. Such amounts provide a coating layer having excellent UV-reflectivity.

The coating layer may further comprises a binder selected from the group consisting of polyester, polyamide, polyurethane, PVC, PVDF, polyolefin, acrylic, silicone-based binders, and combinations thereof. The binder is preferably a polyurethane or acrylic binder. Thus, the h-BN pigment may be used with most commonly known coating systems, again reducing the cost and disruption of implementing an h-BN coated camouflage. The coating layer may comprise from about 50 wt % to about 80 wt % of the binder, preferably from about 60 wt % to about 70 wt %, defined as dry weight relative to the total dry weight of the coating layer.

The camouflage material may further comprise an NIR/SWIR absorbing sub-layer arranged between the polymer substrate and the coating layer. This provides a camouflage material that may even more closely mimic the spectral reflectivity properties of snowy environments.

The polymer substrate may be selected from the group consisting of polyester, polyamide, polyurethane, PVC, PVDF, polyolefin, and combinations thereof. Thus, the invention is compatible with most commonly utilized substrates, helping to reduce the cost and disruption of implementing the invention.

The camouflage material may be a film, sheet, textile, yarn, or rope. A variety of materials comprising excellent winter camouflage properties may thus thereby be provided.

According to another aspect of the invention, a camouflage product is provided in accordance with the appended claims. The camouflage product comprises a camouflage material as described herein. The camouflage product may for example be a net, shelter, screen, mobile camouflage, or garment.

Further objects, advantages and novel features of the present invention will become apparent to one skilled in the art from the following detailed description.

BRIEF DESCRIPTION OF THE DRAWINGS

For a fuller understanding of the present invention and further objects and advantages of it, the detailed description set out below should be read together with the accompanying drawings, in which the same reference notations denote similar items in the various diagrams, and in which.

DETAILED DESCRIPTION

Figure 1:
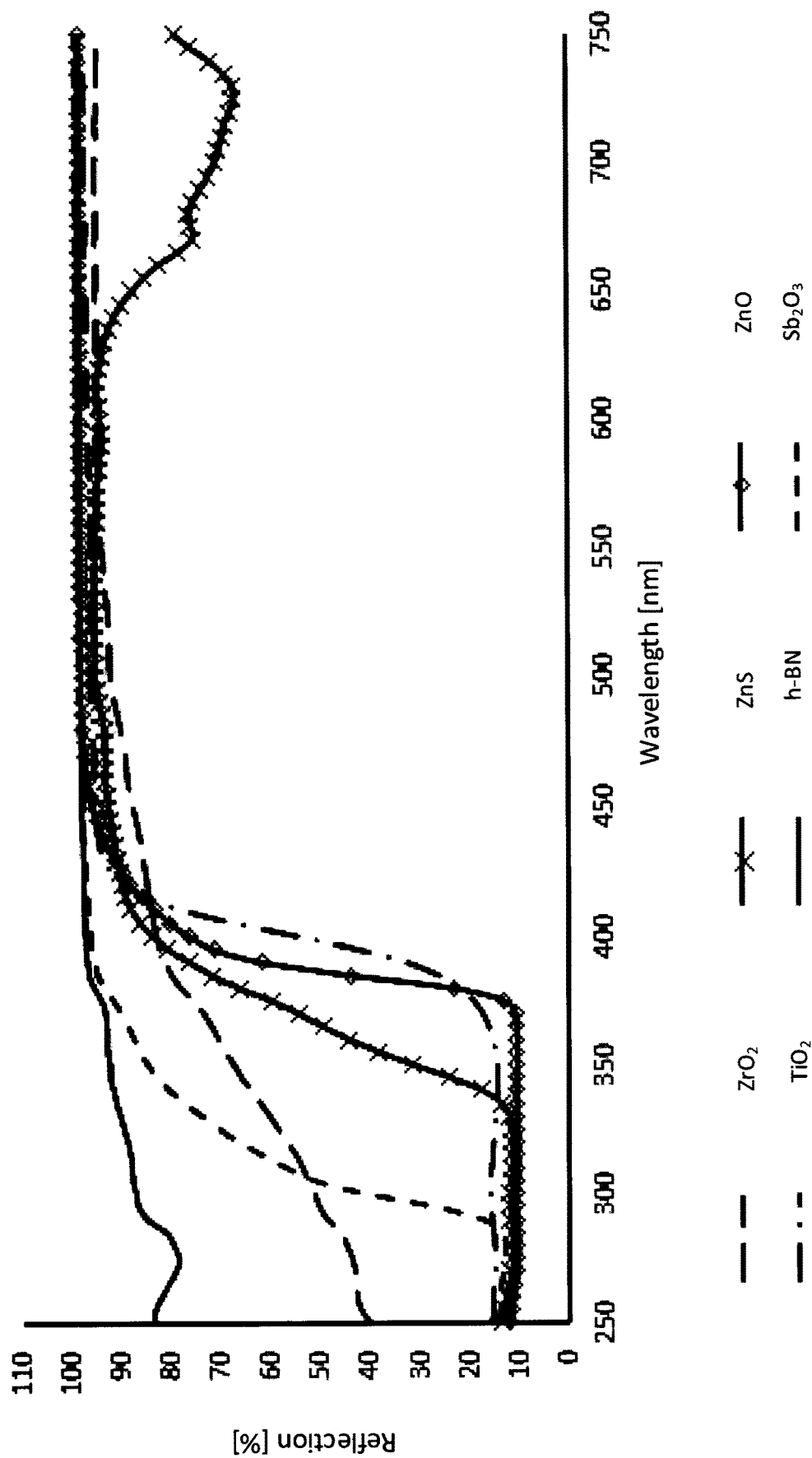
FIG. 1 illustrates the reflectance spectra of a number of UV-reflective pigments in powder form.

The terms winter camouflage and snow camouflage are used interchangeably herein to designate a camouflage material having high UV reflectivity. Such camouflage materials may typically comprise a visual snow camouflage pattern adapted for use in environments where snow may be present. A visual snow camouflage pattern is a pattern arranged to provide visual crypsis in a snowy environment, using for example background colour-matching and disruptive colouration techniques. Visual snow camouflage patterns may predominantly be white, with other colours such as grey being used to break up the shape of the camouflaged object. Such patterns are well known in the art.

Hexagonal Boron Nitride

Boron nitride is a compound of boron and nitrogen having the chemical formula BN. It exists in various crystalline forms (polymorphs). The boron nitride used in the present invention is hexagonal boron nitride (h-BN), a polymorph having a graphitic (graphite-like) 2-D layer structure. Hexagonal boron nitride is exceptionally well suited as a visually white and UV reflective pigment for use in winter camouflage material.

Hexagonal boron nitride is used herein as a white pigment having superior reflective properties in the UV spectral range as compared to other UV reflecting pigments. This advantage is especially pronounced at wavelengths lower than 350 nm, such as within the UVB range. However, for use in winter camouflage, it is not sufficient that the pigment per se is reflective (both within the UV range and also within the visual range in order to appear white), it must also retain this reflectivity when incorporated into the camouflage material. In order to ensure that the pigment is reflective and not transparent when incorporated into a matrix, it is therefore important that the pigment has a refractive index that differs sufficiently from the matrix at the relevant wavelength. For example, the common fillers calcium carbonate and barium sulfate in isolated powder form have excellent UV reflectance and appear white. However, they have a refractive index (circa 1.59 for calcium carbonate and 1.64 for barium sulfate) that is similar to common binders (usually circa 1.5), and thus they appears transparent and are relatively non-UV reflective when incorporated in a binder. In contrast, hexagonal boron nitride has a refractive index that varies depending on wavelength. Hexagonal boron nitride has a refractive index within the visual range of approximately 2, somewhat higher within the UV-range and somewhat lower within the IR range. This means that h-BN has good reflectivity within the UV and visual ranges when incorporated in a common binder, but is somewhat more transparent within the IR range (e.g. $\lambda > 750$ nm). Thus, the NIR and/or SWIR properties of the camouflage material may be tailored using a layer arranged beneath a layer comprising h-BN. Snow has a low reflectance in wavelengths of c:a 1200 nm and longer. By arranging a NIR/SWIR absorbing sub-layer beneath the layer comprising hexagonal boron nitride, a camouflage having spectral reflectance properties that accurately mimic snow may be obtained. The NIR/SWIR absorbing sub-layer may for example be a layer having a hemispherical reflectance of less than 30% at a wavelength of 1300 nm.

In order to ensure good reflectivity and obtain optimal pigment coverage, the particle size of the pigment is important. It is preferred that the h-BN pigment used in the present invention has a particle size of from about 0.1 µm to about less than 1 µm, preferably from about 0.3 µm to about 0.8 µm, even more preferably from about 0.4 µm to about 0.6 µm. Varying grades of hexagonal boron nitride having different particle sizes are readily commercially available. The particle size distribution of h-BN powders may be measured using for example laser diffraction methods as defined in standard ISO 13320:2009 "Particle size analysis—Laser diffraction methods".

Besides having excellent visual and UV-reflecting properties, hexagonal boron nitride has several further properties making it exceptionally suitable for use in camouflage. The relatively low density of h-BN in relation to other known UV-reflecting pigments means that camouflage material manufactured using h-BN as the UV-reflecting pigment may be made lighter than prior winter camouflage, potentially making it easier to transport and deploy. It is also non-toxic and is not classified as hazardous in any manner according to standards such as GHS (Globally Harmonized System of Classification and Labelling), CLP (EU Classification, Labelling and Packaging regulation) and OSHA (Occupational Safety and Health Administration). This facilitates safe production and handling of the camouflage material, and makes camouflage materials comprising h-BN an environmentally sound choice.

A further interesting feature of h-BN is that it is very stable: thermally, chemically and photochemically, meaning that camouflage materials manufactured using h-BN may be very robust. In order to obtain an optimal performance and service life in demanding environments, such as outdoors, it is preferred if the amount of hexagonal boron nitride used in any single component of the camouflage material comprising h-BN does not exceed about 50 wt %, and may preferably be from about 30 wt % to about 40 wt %, defined as dry weight relative to the total dry weight of the component. Since some components of the camouflage material may lack h-BN, for example a substrate which is coated with a coating layer comprising h-BN, the total amount of h-BN present in the camouflage material may be very low, for example as low as 1 wt %, defined as dry weight relative to the total dry weight of the camouflage material, depending on the thickness and density of the substrate.

Camouflage

Hexagonal boron nitride may be used to provide UV signature management in any camouflage product known in the art. This includes camouflage products comprising a camouflage material as described herein, but also camouflage compositions for application to personnel, equipment and/or hardware. For example a camouflage product comprising a camouflage material may be a static camouflage such as a camouflage net, shelter (e.g. tent) or screen, mobile camouflage (e.g. for vehicles), or a camouflaged garment (such as for example a uniform, tactical suit or poncho). A camouflage composition product may be for example a face-paint or vehicle coating.

The camouflage material itself may be any camouflage material known in the art, including but not limited to a substrate such as a thin film or sheet, a textile (such as a woven or non-woven fabric, or net), yarn, or rope. The substrate may comprise or consist primarily of any suitable material. Synthetic polymers such as polyesters (e.g. PET), polyamide (e.g. nylon), polyurethane, PVC, PVDF, polyolefin (e.g. PE and PP), acrylic, and silicone are preferred.

The camouflage material may comprise or consist of a substrate or matrix directly incorporating hexagonal boron nitride, for example the substrate may be a film comprising polymer/h-BN composite material. However, the camouflage material may also comprise of a substrate essentially free of hexagonal boron nitride, wherein the substrate is coated with a coating layer comprising hexagonal boron nitride. By coating with a coating layer it is meant that the substrate is at least partly coated and that a coating layer comprising h-BN has been applied to the at least partly coated substrate, although not necessarily directly on the substrate. For example, the substrate may be fully or partially covered with one or more intermediate layers prior to applying the full or partial coating layer comprising h-BN. Subsequent coating layers fully or partially covering the layer comprising h-BN may be applied onto the layer comprising h-BN. It is also envisioned that the camouflage material may comprise h-BN in both the substrate and one or more coating layers. For example, the substrate may have a first amount of h-BN and the coating layer may have a second amount of h-BN differing from the first concentration.

The coating layer may comprise hexagonal boron nitride dispersed in a binder. Hexagonal boron nitride is compatible with most binders systems, such as water-dispersed, solvent-dispersed and dryblend systems. The binder may for example be selected from the group consisting of polyester, polyamide, polyurethane, PVC, PVDF, polyolefin, acrylic, and silicone-based binders. As previously discussed, it is preferable if the amount of h-BN in the coating layer does not exceed the critical pigment volume concentration, and therefore the coating layer may comprise from about 20 wt % to about 50 wt % h-BN, and may preferably comprise from about 30 wt % to about 40 wt %, defined as dry weight relative to the total dry weight of the coating layer.

The coating layer may comprise further substances as applicable and known in the art. For example, the coating layer may comprise further pigments, wetting agents, defoamers, fungicides, curing agents, hardeners, or rheology modifying agents such as thickeners. The coating layer may be applied by any means known in the art, for example as a dispersion in solvent or water.

The coating layer may preferably be as thin and light as possible, while maintaining good signature management properties. For example, the coating layer may have a thickness of from about 10 μm to about 100 μm, preferably from about 15 μm to about less than 30 μm. The thickness of a coating layer may be estimated from the area coated and the coating weight, provided that the specific density of the coating is known. Alternatively, the thickness of a dry coating layer may be determined using for example the methods of ISO standard ISO 2808:2007 "Paints and varnishes—determination of film thickness".

The invention will now be described in more detail with reference to certain exemplifying embodiments and the figures. However, the invention is not limited to the exemplifying embodiments discussed herein and/or shown in the figures, but may be varied within the scope of the appended claims.

EXAMPLES

UV-VIS Reflectance of Pigment Powders

The hemispherical reflectance spectra of a number of common white and UV-reflecting pigments were obtained. Measurements were performed using a PerkinElmer Lambda 950S UV/VIS spectrophotometer with integrated sphere. Each pigment sample was enclosed in powder form in a polyethylene bag. Spectralon (Labsphere SRS-99-020) was used as a white reflectance standard in order to establish a baseline reflectance. The results are shown in FIG. 1, which shows the hemispherical reflectance (Y-axis) as a function of wavelength in nanometres (X-axis) for a series of common pigments ($ZrO_2$, ZnS, ZnO, $TiO_2$, $Sb_2O_3$) and h-BN.

From FIG. 1 it can be seen that more-or-less all of the pigments tested display good reflectance in the visible (380-780 nm) range. However, at UV wavelengths (<400 nm) the reflectance is substantially decreased for most pigments. It can be seen that hexagonal boron nitride is the exception, having a hemispherical reflectance of well in excess of 80% at wavelengths from 300-400 nm. The next best performing pigment, antimony trioxide ($Sb_2O_3$), has a hemispherical reflectance of approximately 40% at 300 nm.

Note however that antimony trioxide is classified as a suspected carcinogen in chemical classification systems such as GHS.

Incorporation of h-BN in Binder

The table below provides the density and refractive index of a number of common white and UV-reflective pigments.

| Pigment | Density | Refractive index |
| --- | --- | --- |
| Titanium dioxide | 4.3 g/cm$^3$ | 2.7 |
| Antimony trioxide | 5.2 g/cm$^3$ | 2.3 |
| Zinc sulphide | 4.0 g/cm$^3$ | 2.4 |
| Zinc oxide | 5.6 g/cm$^3$ | 2.0 |
| Zirconium dioxide | 5.9 g/cm$^3$ | 2.1 |
| Hexagonal boron nitride | 2.2 g/cm$^3$ | =2 * |

* In the visible range

It can be seen that the pigments generally have a high density, with the notable exception of h-BN which has a density of only 2.2 g/cm$^3$. This allows the camouflage material to be lighter, since less pigment mass is required.

In order to be maintain reflectance when incorporated in binder, it is important that the refractive index of the pigment differs significantly from that of the binder. Since binders typically have a refractive index of approximately 1.5, it is preferable that the pigment has a refractive index of >1.7. All of the pigments listed in the table have refractive index greater than 1.7. Note however that a number of substances having good UV-VIS reflectance, such as calcium carbonate and barium sulfate, have insufficiently high refractive index (1.59 and 1.64 respectively), meaning that they are not effective as pigment in the visual range.

A further property that is relevant for optimising the properties of the pigment is the particle size. All pigments have a reflectance maximum of visible light at a certain particle size, and this in turn determines the optimal particle size for best coverage using the pigment. The optimal particle size can be approximated using Weber's formula:

$$D = \frac{\lambda}{2.1(n_P - n_B)}$$

wherein D is the particle diameter in microns;
  $\lambda$ is the incident light wavelength in microns (taken to be 0.55 µm for visible light in this case);
  $n_B$ is the refractive index of the binder (circa 1.5); and
  $n_p$ is the refractive index of the pigment (circa 2 for h-BN in the visible range).

Using this formula, the particle size giving optimal coverage is determined to be approximately 0.5 µm, and therefore h-BN particle sizes of from about 0.1 µm to about 1 µm should provide satisfactory coverage.

An example of a coating layer composition comprising h-BN is as follows:

| Substance | Amount (wt % relative to total weight of composition) |
| --- | --- |
| h-BN (0.5 µm particle size) | 15 |
| Wetting agent (Disperbyk-199) | 1.5 |
| Defoaming agent (BYK 093) | 0.5 |
| Binder (aqueous PU dispersion) | 30 |
| Water | 51.5 |
| Thickener (Rheovis HS 1212) | 1.0 |
| Hardener (CX-100) | 0.5 |

It is understood however that the composition (both components and ratios) of the coating composition may be varied by the skilled person within the scope of the appended claims.

Hexagonal boron nitride is added to a blend of the water and wetting agent, and is dispersed to provide a homogenous mixture. The defoamer and binder are added and the mixture is blended until evenly mixed. If necessary, a thickener is added using vigorous stirring. Hardener is stirred into this coating composition at most 24 hours before application.

The coating composition was applied as a thin film to the substrate, a black/white Leneta Opacity Card, using a wire bar coater, and the coated substrate was cured in an over at 160° C. for 3 minutes. The resulting coating layer was approximately 15-20 µm thick, as determined using the coated area, weight of coating added, and specific density of the coating.

UV-VIS Reflectance of h-BN Coated Substrate

Figure 2:
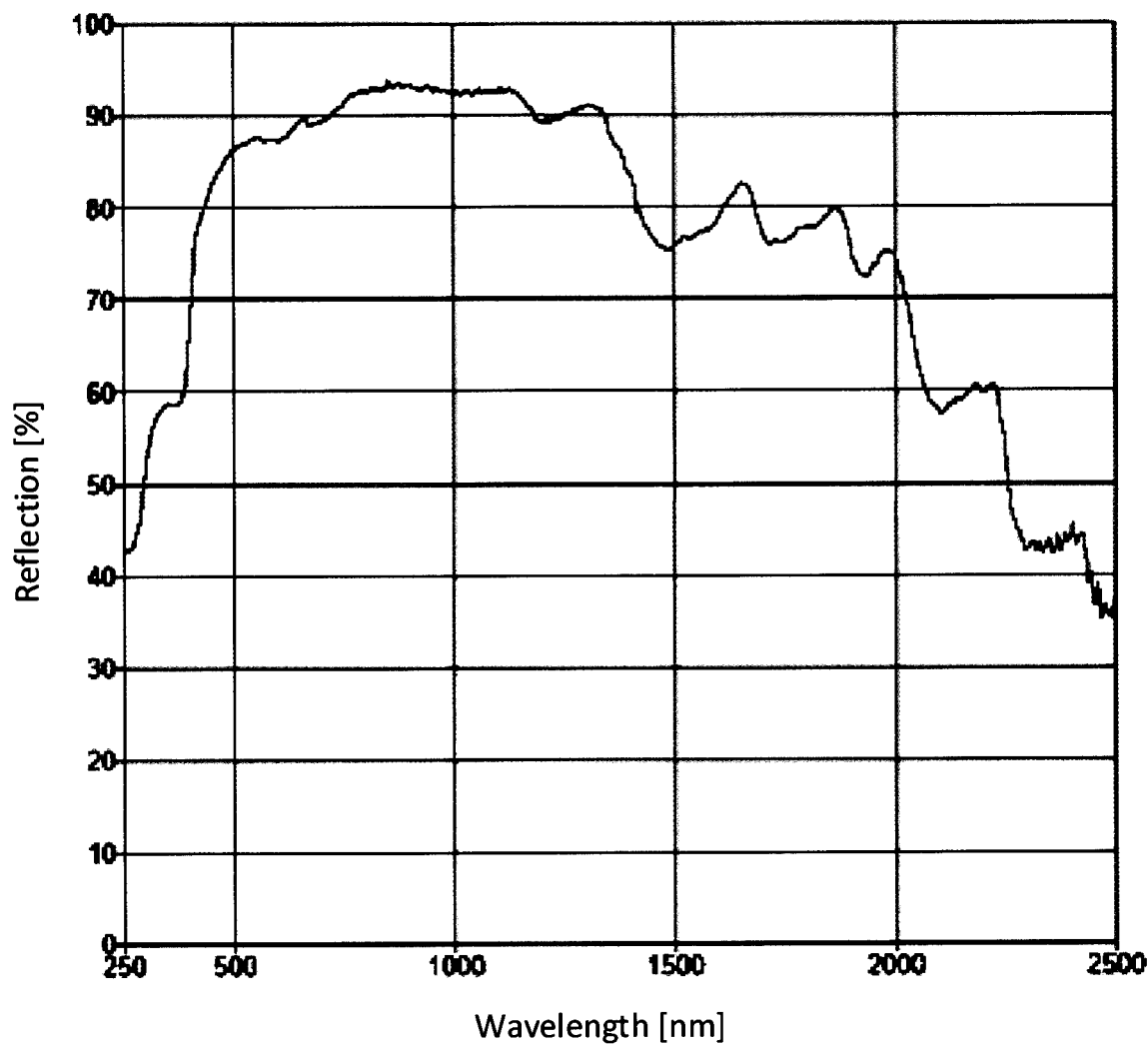
FIG. 2 illustrates the reflectance spectrum of a substrate coated with a film comprising hexagonal boron nitride.

FIG. 2 shows the hemispherical reflectance spectra of the coated substrate as obtained above, measured at the white portion of the substrate. The hemispherical reflectance spectra is the hemispherical reflectance of the coated substrate (Y-axis) as a function of wavelength in nanometres of (X-axis).

It can be seen that even when incorporated in a binder, the hexagonal boron nitride pigment maintains a good UV-reflectance, and is superior to all other tested pigments, particularly in the wavelength range of from about 250 nm to about 350 nm (other pigments not shown). The h-BN coating obtained is visually opaque and is mechanically robust.

The invention claimed is:

1. A camouflage material for use in a snowy environment, wherein the camouflage material comprises hexagonal boron nitride,
  wherein the camouflage material is a film, sheet, textile, yarn, or rope comprising the hexagonal boron nitride dispersed in a polymer matrix, and wherein the hexagonal boron nitride has a particle size from about 0.4 µm to about less than 1 µm.

2. The camouflage material according to claim 1, wherein the hexagonal boron nitride has a particle size from about 0.4 µm to about 0.6 µm.

3. The camouflage material according to claim 1, comprising from about 1 wt % to about 50 wt % of the hexagonal boron nitride.

4. The camouflage material according to claim 1, wherein a surface of the camouflage material comprises a visual snow camouflage pattern designed to provide visual crypsis in a snowy environment.

5. The camouflage material according to claim 1, wherein the film, sheet, textile, yarn, or rope comprises a coated polymer substrate comprising a coating layer and a polymer substrate, wherein the coating layer comprises hexagonal boron nitride dispersed in a polymer binder.

6. The camouflage material according to claim 5, wherein the coating layer has a thickness of from about 10 µm to about 100 µm.

7. The camouflage material according to claim 5, wherein the coating layer comprises from about 20 wt % to about 50 wt % of the hexagonal boron nitride.

8. The camouflage material according to claim 5, wherein the coating layer further comprises a binder selected from the group consisting of polyester, polyamide, polyurethane, PVC, PVDF, polyolefin, acrylic, silicone-based binders, and combinations thereof.

9. The camouflage material according to claim 8, wherein the coating layer comprises from about 50 wt % to about 80 wt % of the binder.

10. The camouflage material according to claim 5, further comprising an NIR/SWIR absorbing sub-layer arranged between the polymer substrate and the coating layer.

11. The camouflage material according to claim 5, wherein the polymer substrate is selected from the group consisting of polyester, polyamide, polyurethane, PVC, PVDF, polyolefin, and combinations thereof.

12. A camouflage product comprising a camouflage material according to claim 1, wherein the camouflage product is a net, shelter, screen, mobile camouflage, or garment.

13. The camouflage material according to claim 1, wherein the hexagonal boron nitride provides high ultraviolet (UV) reflectance.

14. A camouflage composition product, comprising hexagonal boron nitride dispersed in a polymer binder, wherein the polymer binder is selected from the group consisting of polyester, polyamide, polyurethane, PVC, PVDF, polyolefin, acrylic, and silicone-based binders, and wherein the hexagonal boron nitride has a particle size from about 0.4 µm to about less than 1 µm.

\* \* \* \* \*